(12) United States Patent
Klawunn et al.

(10) Patent No.: US 12,459,581 B2
(45) Date of Patent: Nov. 4, 2025

(54) FASTENING ARRANGEMENT FOR A BUSH SHAFT FIXED TO A VEHICLE BODY

(71) Applicant: Bayerische Motoren Werke Aktiengesellschaft, Munich (DE)

(72) Inventors: Thomas Klawunn, Dingolfing (DE); Carsten Lankenau, Munich (DE); Marco Parisi, Munich (DE); Tatjana Schoierer, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/693,695

(22) PCT Filed: Sep. 20, 2022

(86) PCT No.: PCT/EP2022/076065
§ 371 (c)(1),
(2) Date: Mar. 20, 2024

(87) PCT Pub. No.: WO2023/046667
PCT Pub. Date: Mar. 30, 2023

(65) Prior Publication Data
US 2024/0383542 A1   Nov. 21, 2024

(30) Foreign Application Priority Data
Sep. 21, 2021 (DE) .................. 10 2021 124 320.3

(51) Int. Cl.
*B62D 27/02* (2006.01)
(52) U.S. Cl.
CPC .................................. *B62D 27/02* (2013.01)
(58) Field of Classification Search
CPC ...... B62D 27/04; B62D 27/02; B62D 27/023; B62D 21/09; B62D 21/15; B62D 21/157
See application file for complete search history.

(56) References Cited

U.S. PATENT DOCUMENTS 5,085,485 A *  2/1992  Wurl .......................... E04C 3/06
                                                              52/843
5,501,289 A    3/1996  Nishikawa et al.
(Continued)

FOREIGN PATENT DOCUMENTS

CN    103347771 A    10/2013
CN    104417621 A    3/2015
(Continued)

OTHER PUBLICATIONS

International Search Report (PCT/ISA/210) issued in PCT Application No. PCT/EP2022/076065 dated Feb. 3, 2023 (3 pages).
(Continued)

*Primary Examiner* — Jonathan P Masinick
(74) *Attorney, Agent, or Firm* — Crowell & Moring LLP

(57) ABSTRACT

A fastening arrangement for a vehicle-body-mounted bush shaft. The bush shaft is fastenable in a U-shaped structure. The bush shaft has a base extending in an XY direction and has first and second side pieces extending in a Z direction. The bush shaft is arrangeable on the base. The fastening arrangement includes a first strut and a second strut disposed parallel to the first strut. The first and second struts extend normal to a longitudinal axis of the bush shaft in a Y direction and are arrangeable against the bush shaft in the U-shaped structure. A first lug is disposed at a first end of the first strut, a second lug is disposed at a first end of the second strut, and the first lug and the second lug are each bent parallel to the first side piece. The first and second struts are connected via a crosspiece.

12 Claims, 3 Drawing Sheets

(56) References Cited

U.S. PATENT DOCUMENTS

| | | | | |
|---|---|---|---|---|
| 6,053,564 | A * | 4/2000 | Kamata | B62D 21/09 |
| | | | | 296/187.1 |
| 6,217,109 | B1 * | 4/2001 | Okana | B62D 25/025 |
| | | | | 296/203.03 |
| 6,237,304 | B1 * | 5/2001 | Wycech | B62D 29/002 |
| | | | | 296/187.02 |
| 6,877,754 | B2 * | 4/2005 | Kim | B62D 21/11 |
| | | | | 280/124.109 |
| 7,198,691 | B2 * | 4/2007 | Ludin | B29C 70/48 |
| | | | | 244/133 |
| 7,393,015 | B1 * | 7/2008 | Gillespie | B62D 21/11 |
| | | | | 180/312 |
| 7,631,918 | B2 * | 12/2009 | Yasukouchi | B62D 25/2027 |
| | | | | 296/30 |
| 7,854,474 | B2 * | 12/2010 | Cox | B62D 25/082 |
| | | | | 180/312 |
| 8,801,072 | B2 * | 8/2014 | Sasage | B62D 24/02 |
| | | | | 296/35.1 |
| 9,073,586 | B1 | 7/2015 | Courtright et al. | |
| 10,023,244 | B2 | 7/2018 | Kurane et al. | |
| 10,946,905 | B2 * | 3/2021 | Jansma | B62D 21/09 |
| 2006/0097533 | A1 * | 5/2006 | Watanabe | B62D 25/025 |
| | | | | 296/30 |
| 2009/0115224 | A1 * | 5/2009 | Weirup | B62D 21/09 |
| | | | | 296/30 |
| 2010/0096888 | A1 | 4/2010 | Cox | |
| 2013/0049408 | A1 * | 2/2013 | Kurogi | B62D 25/2027 |
| | | | | 29/897.2 |
| 2013/0300158 | A1 | 11/2013 | Andree et al. | |
| 2015/0054308 | A1 | 2/2015 | Mildner et al. | |

FOREIGN PATENT DOCUMENTS

| | | | |
|---|---|---|---|
| DE | 19637242 A1 * | 3/1998 | ............ B62D 21/09 |
| DE | 10 2011 015 542 A1 | 10/2012 | |
| DE | 10 2017 129 159 A1 | 6/2018 | |
| EP | 1 860 021 A2 | 11/2007 | |
| JP | 4-41471 U | 4/1992 | |
| KR | 10-2012-0060022 A | 6/2012 | |

OTHER PUBLICATIONS

German-language German Search Report issued in German Application No. 10 2021 124 320.3 dated Aug. 22, 2022, with partial English translation (6 pages).

English translation of Chinese-language Office Action issued in Chinese Application No. 202280047617.1 dated Mar. 17, 2025 (7 pages).

* cited by examiner

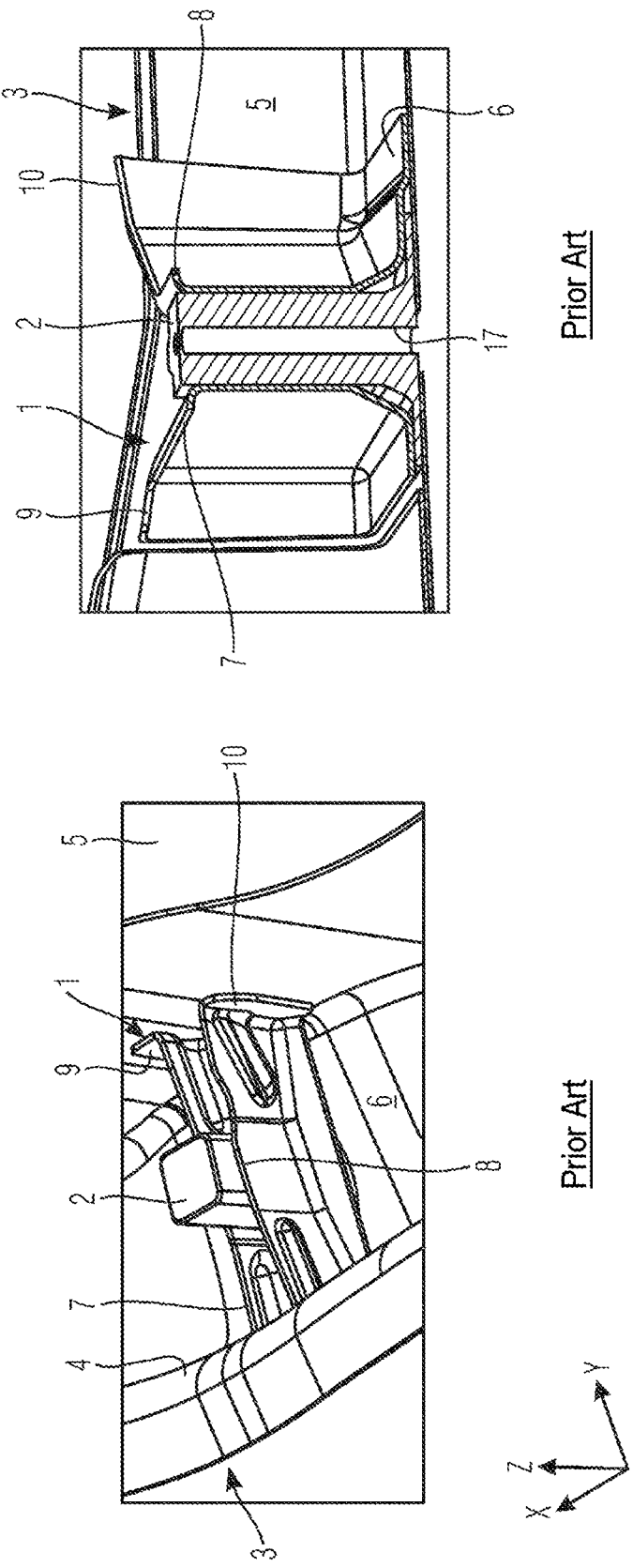

FASTENING ARRANGEMENT FOR A BUSH SHAFT FIXED TO A VEHICLE BODY

BACKGROUND AND SUMMARY

The invention relates to a fastening arrangement for a vehicle-body-mounted bush shaft, in particular for motor vehicles.

It is often the case that force-absorbing elements such as vehicle-body-mounted bush shafts are fastened in a profile, preferably a U profile, and are then supported in a profile by means of reinforcing partitions. These reinforcing partitions are used, for example, in motor-vehicle manufacturing. An application example for reinforcing partitions is constituted by, for instance, the use as chassis bushes, for the attachment of axle supports. These are used in the body of all vehicles and are joined to a profile, in one or more method steps, by suitable connection processes (see FIGS. 1 and 2). The bush shaft which is to be supported is fitted into the profile (usually through a through-passage hole) and connected to the profile. Further application examples are constituted by, for example, axle bushes or the rear structure of a motor vehicle with crossmembers and, for example, with points of attachment for instance for high-voltage batteries.

Such a partition structure is known, for example, from German laid-open application DE 10 2011 015 542 A1.

Reinforcing partitions which support a bush shaft in relation to a profile give rise to a number of technical problems:

1. Depending on the installation sequence, the partitions, or fastening arrangements, exert force on the aforementioned bush shaft, i.e., spatially precise positioning of the bush shaft is difficult.
2. The automated installation of the fastening arrangement requires the use of a receiving cavity, which impedes access for joining purposes (e.g., spot welding); this disadvantageously necessitates a number of joining steps.
3. A multiple-part fastening arrangement has to be joined in more than one joining step; this is laborious and therefore expensive.

The object of the invention is to improve the quality, and to reduce the installation costs, of reinforcing partitions.

This object is achieved by the feature that the first strut and the second strut are connected to one another adjacent to the bush shaft via at least one first crosspiece, which extends in the X direction.

The fastening arrangement of the invention, or the partition, advantageously has the property of comprising two partition halves—the first strut and the second strut—which are connected to one another via the first crosspiece. This first crosspiece makes it possible for the fastening arrangement to be fitted over the bush shaft by way of three points of abutment, lines of abutment or surfaces of abutment and to be clamped there in a captive and positionally accurate manner in a profile, for example a U-shaped structure, and then to be connected integrally for example by welding.

The configuration in which the first strut and the second strut and the first crosspiece are in one piece and made of the same material, is a preferred embodiment, and so the fastening arrangement can be represented as an individual component. It is possible for the latter to be produced cost-effectively for example by means of a punching process and to have its three-dimensional structure straightforwardly completed in a sheet-metal-bending process.

The configuration in which the first crosspiece has a first stamped portion, which is resilient in the X direction, advantageously allows the bush shaft to be clamped by means of the fastening arrangement via a first spring mechanism. The captive securing of the bush shaft is further enhanced.

By way of the configuration in which the first strut and the second strut are connected to one another adjacent to the bush shaft, parallel to the first crosspiece, via a second crosspiece, four-sided positioning of the bush shaft provides for further-enhanced positioning accuracy.

The fact that the second crosspiece has a second stamped portion, which is resilient in the X direction (X), further enhances the captive securing and the positioning accuracy of the bush shaft.

The configuration in which, in the region of the bush shaft, the first strut and/or the second strut have/has a lug which is resilient in the X direction and supports the fastening arrangement resiliently in relation to the bush shaft, further improves the positioning of the bush shaft in the X direction on account of the second spring mechanism.

The configuration in which, at each end, the first strut and the second strut have a lug which is bent over parallel to the respective side piece and is supported on a side piece, facilitates the arresting and the fastening of the fastening arrangement in the U-shaped structure.

The configuration in which the lugs are supported resiliently on the first and/or second side piece, facilitates the installation and the fastening of the fastening arrangement in the U-shaped structure, or the profile.

The configuration in which the fastening arrangement can be connected integrally to the bush shaft and/or the structure, is a tried-and-tested and preferred embodiment.

The connection is particularly preferably established by welding or soldering.

The fastening arrangement preferably consists of a metallic material, such as a steel material or a light metal, e.g., aluminum, or of a plastic material, preferably a glass-fiber-reinforced plastic (GFRP) or carbon-fiber-reinforced plastic (CFRP).

A motor vehicle having a fastening arrangement according to the invention is also disclosed.

The invention will be briefly explained hereinbelow using two figures from the prior art and five figures corresponding to the invention.

BRIEF DESCRIPTION OF THE DRAWINGS

FIG. 1 shows a plan view of a first fastening arrangement according to the prior art.

FIG. 2 shows a plan view of a section through a second fastening arrangement according to the prior art.

DETAILED DESCRIPTION OF THE DRAWINGS

Figure 3:
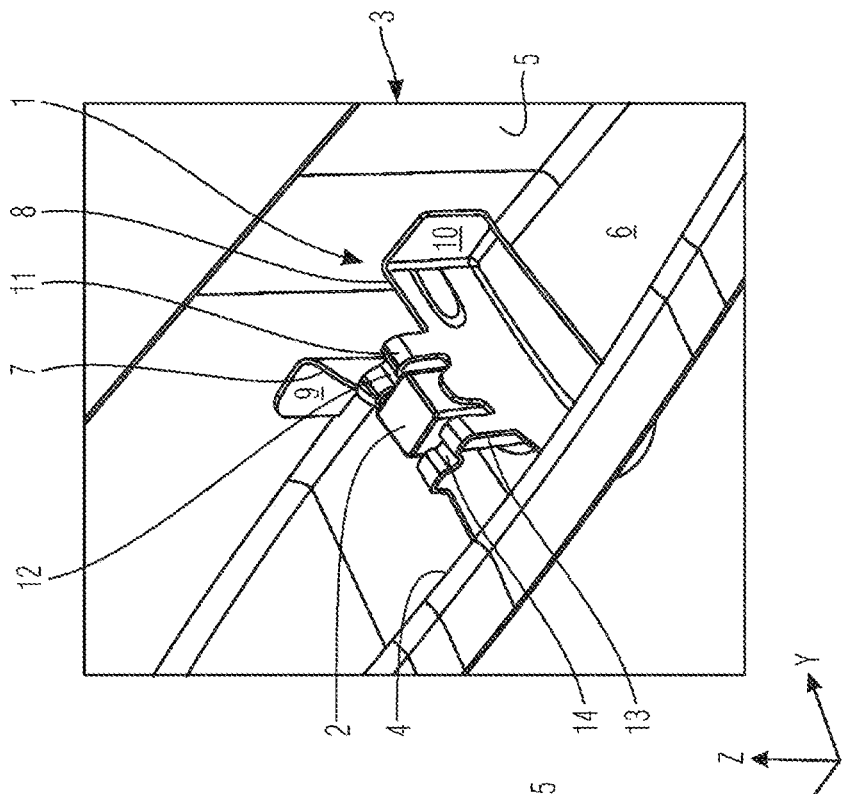
FIG. 3 shows a plan view of a first fastening arrangement according to the invention.

Hereinbelow, the same reference signs apply to the same components in FIGS. 1 to 7.

FIG. 1 shows a plan view of a first fastening arrangement 1 for a vehicle-body-mounted bush shaft 2 according to the prior art. The fastening arrangement 1 is provided for a bush shaft 2, which in this exemplary embodiment is of square cross section and is provided so as to extend largely in a Z direction. The bush shaft 2 can be fastened in an at least partially U-shaped structure 3—a profile—which extends largely in an X direction, with a base extending in an XY direction and a first and a second side piece 4, 5 extending in a Z direction. The bush shaft 2 is arranged and fastened on the base 6 largely normal to a base surface. For this purpose, the bush shaft 2 has for example a fastening foot, which can be seen in FIG. 2 (but has no reference sign). Fastening can take place for example by means of friction welding. In a further exemplary embodiment, it is also possible for the bush shaft 2 to be fitted through a bore in the base 6 and joined.

The X direction, the Y direction and the Z direction are represented in a coordinate system on the left-hand side beneath FIG. 1.

The fastening arrangement 1 essentially comprises a first strut 7 and a second strut 8, arranged parallel to the first strut 7, and the two struts extend largely normal to a longitudinal axis (which has no reference sign) of the bush shaft 2 in the Y direction. The struts 7, 8 butt against the bush shaft 2 and extend in the U-shaped structure 3 from one side piece 4 to an opposite side piece 5, wherein, at one end, each strut 7, 8 has a lug 9, 10 which is bent over parallel to the respective side piece 4, 5 and is supported on the side piece 4. The struts 7, 8 also have reinforcing beads (which have no reference sign).

Such fastening arrangements 1 of the type in question, or reinforcing partitions, are used for example in motor-vehicle manufacturing. An application example for reinforcing partitions is constituted by, for instance, the use as chassis bushes, for the attachment of axle supports. The bush shaft 2 to be supported is fitted for example into the profile, or U-shaped structure 3, and connected thereto. Further application examples are constituted by, for example, axle bushes or the rear structure of a motor vehicle with crossmembers and with points of attachment for, for instance, high-voltage batteries.

FIG. 2 shows a plan view of a section through a second fastening arrangement 1 according to the prior art. In this representation, the fastening arrangement 1 has no fastening beads. Clearly visible is the fastening foot (which has no reference sign) of the bush shaft 2, which rests on the base 6 of the U-shaped structure 3 and can also be connected to the base 6 for example by friction welding. The bush shaft 2 has a central bore 17, and for example further components can be introduced into the same and fastened. In this exemplary embodiment, the fastening arrangement 1 extends over the fastening foot. It is also possible for further bush shafts 2 to have for example a round or rectangular cross section, depending on how they are used in each case.

FIG. 3 shows a plan view of a first fastening arrangement 1 for a vehicle-body-mounted bush shaft 2 according to the invention. In this exemplary embodiment, in contrast to FIG. 1 and FIG. 2, the first strut 7 and the second strut 8 are connected to one another adjacent to the bush shaft 2 via a first crosspiece 11 and a second crosspiece 13, which extend in the X direction. In a further exemplary embodiment, it is also possible to provide just a single crosspiece 11 or 13.

In addition, it is preferably the case that the first strut 7, the second strut 8 and also the first crosspiece 11 and the second crosspiece 13 are in one piece and made of the same material. This is a preferred embodiment in which the fastening arrangement 1 can be represented as an individual component, as opposed to at least two components, as known from the prior art. It is possible for the fastening arrangement 1 to be straightforwardly produced cost-effectively for example by means of a punching process and a subsequent sheet-metal-bending process.

In addition, the first crosspiece 11 has a first stamped portion 12, which is resilient in the X direction, and the second crosspiece 13 has a second stamped portion 14, which is likewise resilient in the X direction. This advantageously allows the bush shaft 2 to be clamped by means of the fastening arrangement 1 by way of a first spring mechanism. The captive securing of the bush shaft 2 is further enhanced. In a further exemplary embodiment, it is also possible for just one crosspiece 11, 13 to have this stamped portion.

Figure 6:
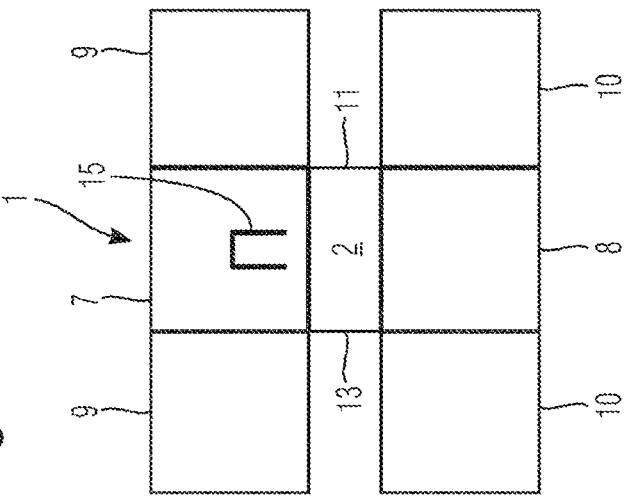
FIG. 6 shows a plan view of a projected development of a first fastening arrangement according to the invention.
Figure 5:
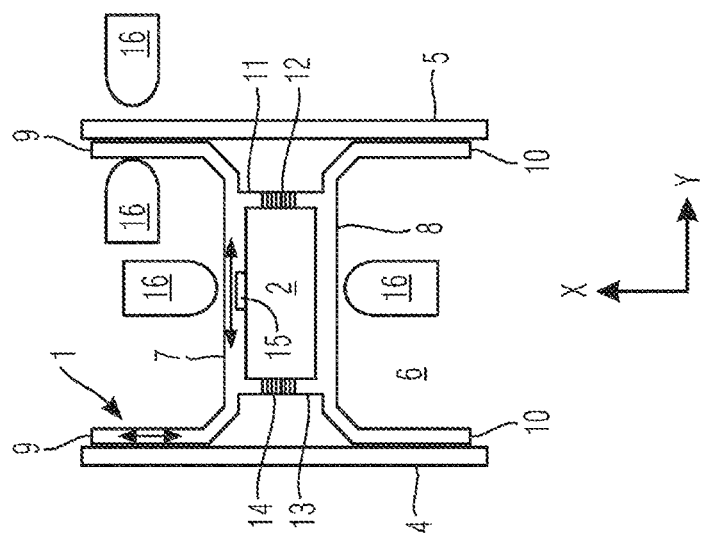
FIG. 5 shows a plan view of a schematic representation of the fastening arrangement according to the invention.

In addition, in the region of the bush shaft 2, the first strut 7 has a lug 15 which is resilient in the X direction and supports the fastening arrangement 1 resiliently in relation to the bush shaft 2. This resilient lug 15 is represented in FIGS. 5 and 6. In further exemplary embodiments, it is also possible for the first strut 7 and/or the second strut 8 to have such a resilient lug 15. These configurations further improve the positioning of the bush shaft 2 in the X direction by way of a second spring mechanism.

In addition, at each end, the first strut 7 and the second strut 8 have a bent-over lug 9, 10 which runs parallel to the respective side piece 4, 5 and is supported on a respective side piece 4, 5. This design facilitates the arresting and the fastening of the fastening arrangement 1 in the U-shaped structure 3, or in the U-shaped profile. It is also possible for each strut 7, 8 to have just a single bent-over lug 9, 10. In that case, however, the structural rigidity of the construction as a whole is no longer as great and the loading limits are lower.

Furthermore, the lugs 9, 10 are supported resiliently on the first and/or second side piece 4, 5. This embodiment facilitates the arresting and the fastening of the fastening arrangement 1 in the U-shaped structure 3, or in the U-shaped profile.

The fastening arrangement 1 is preferably connected integrally to the bush shaft 2 and/or the U-shaped structure 3. This can be done for example by welding or soldering. Also possible, in addition, are adhesive-bonding connections for fastening arrangements 1 made of a plastic material.

The fastening arrangement 1 is preferably made of a metallic material or of a plastic material. A metallic material is for example a steel material or a light metal, e.g., an aluminium alloy. The plastic material preferably used is a glass-fiber-reinforced plastic (GFRP) or a carbon-fiber-reinforced plastic (CFRP). Adhesive bonding is preferably used for plastic materials.

Figure 4:
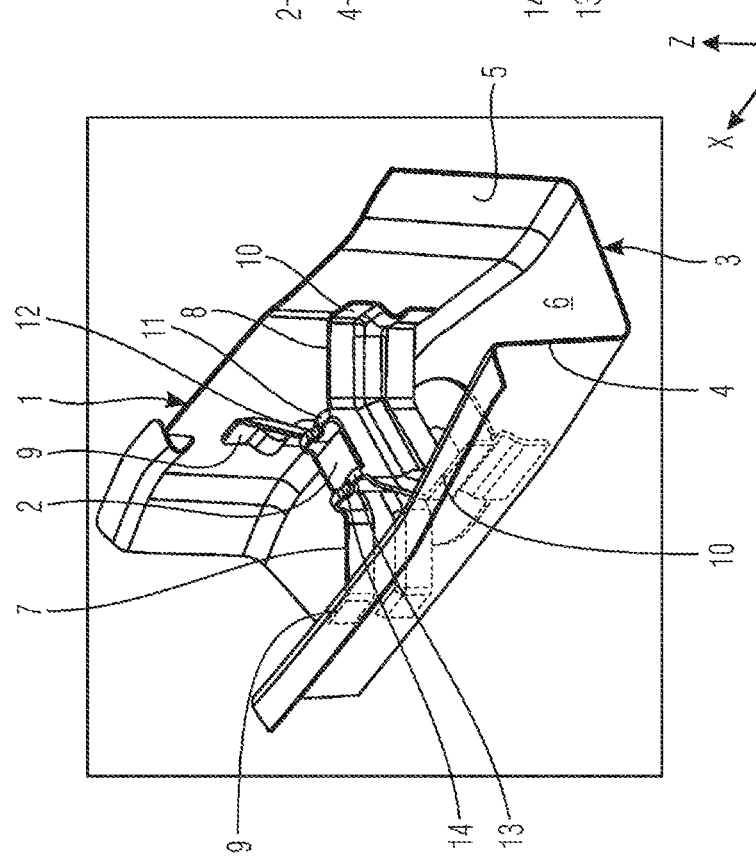
FIG. 4 shows a plan view of a second fastening arrangement according to the invention.

FIG. 4 shows a plan view of a second fastening arrangement 1 for a vehicle-body-mounted bush shaft 2 according to the invention. In contrast to the embodiment in FIG. 3, the second strut 8 and the lug 10 are connected to one another via a further strut (which has no reference), plane-parallel to the base 6 of the U-shaped structure 3. This embodiment facilitates the fastening of the fastening arrangement 1 in the U-shaped structure 3, since the further strut can be connected directly to the base 6, for example by welding processes such as spot welding. Furthermore, the structural rigidity of the fastening arrangement 1 is improved. As a result of this configuration, there can be less stiffness-enhancing beading of the first strut 7 and of the second strut 8 or this beading can be done away with altogether.

FIG. 5 shows a plan view of a schematic illustration of the fastening arrangement 1 according to the invention for a vehicle-body-mounted bush shaft 2. It can be seen to very good effect in FIG. 5 how the fastening arrangement 1 in this exemplary embodiment encloses the bush shaft 2, with a square cross section, on all four sides. Also in this exemplary embodiment, in the region of the bush shaft 2, the first strut 7 has a lug 15 which is resilient in the X direction and supports the fastening arrangement 1 resiliently in relation to the bush shaft 2. This configuration further improves the positioning of the bush shaft 2 in the X direction by way of the second spring mechanism. Of course, it is also possible for the second strut 8 to have a lug 15 which is resilient in the X direction.

In addition, the first crosspiece 11 and the second crosspiece 13 have a first and a second stamped portion 12, 14, which is elastic in the X direction.

Also represented in FIG. 5 are four welding electrodes 16, which clarify how the fastening arrangement 1 can be for example welded onto the bush shaft 2 and the first and the second side piece 4, 5 of the U-shaped structure 3. Of course, it is also possible to use soldering or adhesive bonding as connecting methods, in dependence on the material of the fastening arrangement 1.

The operation of installing the fastening structure 1 in the U-shaped structure 3 can therefore be represented by the following method steps:

fastening the bush shaft 2 on the base 6 of the U-shaped structure 3;
introducing the fastening structure 1 into the U-shaped structure 3 and positioning it around the bush shaft 2, radially outside the same;
fastening the fastening structure 1 on the bush shaft 2 and on the first and/or the second side piece 4, 5.

FIG. 6 shows a plan view of a projected development of a first fastening arrangement 1 according to the invention which is intended for a vehicle-body-mounted bush shaft 2 and is formed in one piece and from the same material for example in the form of a sheet-metal punched part. Represented in the center again is the bush shaft 2, around which the fastening arrangement 1 extends. In the exemplary embodiment in FIG. 6, the first strut 7 of the fastening arrangement 1 has the lug 15 which is resilient in the X direction and supports the fastening arrangement 1 resiliently in relation to the bush shaft 2.

Figure 7:
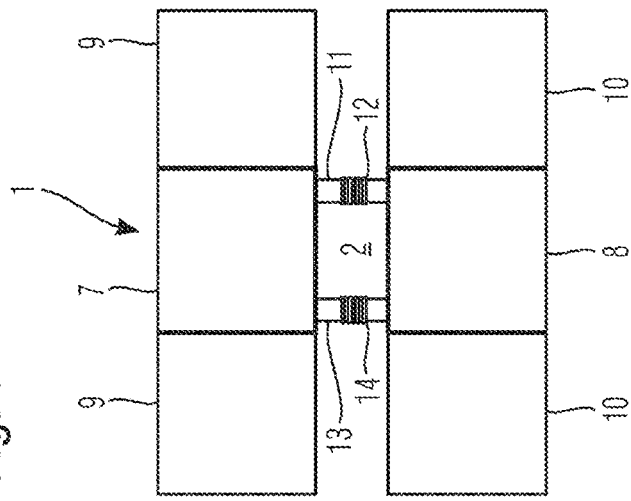
FIG. 7 shows a plan view of a projected development of a second fastening arrangement according to the invention.

FIG. 7 shows a plan view of a projected development of a second fastening arrangement 1 according to the invention, which is likewise formed in one piece and from the same material for example, once again, in the form of a sheet-metal punched part. Represented in the center again is the bush shaft 2, around which the fastening arrangement 1 extends. In the exemplary embodiment in FIG. 7, in turn, the first strut 7 and the second strut 8 are connected to one another adjacent to the bush shaft 2 via the first crosspiece 11 and the second crosspiece 13, which extend in the X direction. The first crosspiece 11 has a first stamped portion 12, which is resilient in the X direction, and the second crosspiece has a second stamped portion 14, which is resilient in the X direction.

It can be seen from FIGS. 5 to 7 that either the fastening arrangement 1 according to the invention can have the lug 15 which is resilient in the X direction and/or the first crosspiece 11 can have a first stamped portion 12, which is resilient in the X direction, and the second crosspiece can have a second stamped portion 14, which is resilient in the X direction.

The configuration of the fastening arrangement 1 according to the invention makes it possible for the latter to be fitted over a bush shaft 2 and to clamp the bush shaft in a captive and positionally accurate manner in a U-shaped structure 3, so that these can then be suitably joined, for example connected to one another by welding.

LIST OF REFERENCE CHARACTERS

1. Fastening arrangement
2. Bush shaft
3. U-shaped structure
4. First side piece
5. Second side piece
6. Base
7. First strut
8. Second strut
9. Lug first strut
10. Lug second strut
11. First crosspiece
12. First stamped portion
13. Second crosspiece
14. Second stamped portion
15. Resilient lug
16. Welding electrode
17. Bore
X X direction
Y Y direction
Z Z direction

What is claimed is:

1. A fastening arrangement for a vehicle-body-mounted bush shaft, wherein the bush shaft extends in a Z direction and is fastenable in an at least partially U-shaped structure which extends in an X direction, wherein the U-shaped structure has a base extending in an XY direction and has a first side piece and a second side piece extending in the Z direction, and wherein the bush shaft is arrangeable and fastenable on the base normal to a base surface, the fastening arrangement comprising:

a first strut; and
a second strut disposed parallel to the first strut;
wherein the first strut and the second strut extend normal to a longitudinal axis of the bush shaft in a Y direction, are arranged in abutment against the bush shaft in the U-shaped structure, and extend in the U-shaped structure from the first side piece of the U-shaped structure to the second side piece of the U-shaped structure when the fastening arrangement is connected to the bush shaft;
wherein a first lug is disposed at a first end of the first strut, wherein a second lug is disposed at a first end of the second strut, and wherein the first lug and the second lug are each bent parallel to the first side piece and are supportable on the first side piece;
wherein the first strut and the second strut are connected to one another adjacent to the bush shaft via a first crosspiece which extends in the X direction.

2. The fastening arrangement according to claim 1, wherein the first strut and the second strut and the first crosspiece are in one piece and are made of a same material.

3. The fastening arrangement according to claim 1, wherein the first crosspiece has a first stamped portion which is resilient in the X direction.

4. The fastening arrangement according to claim 1, wherein the first strut and the second strut are connected to one another adjacent to the bush shaft, parallel to the first crosspiece, via a second crosspiece.

5. The fastening arrangement according to claim 4, wherein the second crosspiece has a second stamped portion which is resilient in the X direction.

6. The fastening arrangement according to claim 1, wherein, in a region of the bush shaft, the first strut and/or the second strut have/has a lug which is resilient in the X direction and supports the fastening arrangement resiliently in relation to the bush shaft.

7. The fastening arrangement according to claim 1, wherein a third lug is disposed at a second end of the first strut, wherein a fourth lug is disposed at a second end of the second strut, and wherein the third lug and the fourth lug are each bent parallel to the second side piece and are supportable on the second side piece.

8. The fastening arrangement according to claim 1, wherein the first lug and the second lug are supportable resiliently on the first side piece.

9. The fastening arrangement according to claim 1, wherein the fastening arrangement is connected integrally to the bush shaft and/or the U-shaped structure.

10. The fastening arrangement according to claim 9, wherein the fastening arrangement is connected integrally to the bush shaft and/or the U-shaped structure by a weld or a solder connection.

11. The fastening arrangement according to claim 1, wherein the fastening arrangement is made of a metallic material or of a plastic material.

12. A motor vehicle, comprising:
the fastening arrangement according to claim 1.

\* \* \* \* \*